(12) United States Patent
Laws et al.

(10) Patent No.: US 7,257,049 B1
(45) Date of Patent: Aug. 14, 2007

(54) METHOD OF SEISMIC SURVEYING, A MARINE VIBRATOR ARRANGEMENT, AND A METHOD OF CALCULATING THE DEPTHS OF SEISMIC SOURCES

(75) Inventors: Robert Laws, Cambridge (GB); Stephen Patrick Morice, Wokingham (GB)

(73) Assignee: W'etsern Geco L.I., Houston, TX (US)

( * ) Notice: Subject to any disclaimer, the term of this patent is extended or adjusted under 35 U.S.C. 154(b) by 680 days.

(21) Appl. No.: 10/070,228

(22) PCT Filed: Aug. 22, 2000

(86) PCT No.: PCT/GB00/03218

§ 371 (c)(1),
(2), (4) Date: Oct. 3, 2002

(87) PCT Pub. No.: WO01/16621

PCT Pub. Date: Mar. 8, 2001

(30) Foreign Application Priority Data

Sep. 2, 1999 (GB) .................................. 9920593.2

(51) Int. Cl.
*G01V 1/38* (2006.01)
*G01V 1/02* (2006.01)
(52) U.S. Cl. .................... 367/23; 367/15; 181/113; 181/120
(58) Field of Classification Search .................. 367/15, 367/23; 181/113, 118, 120
See application file for complete search history.

(56) References Cited

U.S. PATENT DOCUMENTS

| | | | |
|---|---|---|---|
| 4,136,754 A | 1/1979 | Manin | |
| 4,493,061 A | 1/1985 | Ray | |
| 4,721,180 A * | 1/1988 | Haughland et al. | ......... 181/111 |
| 4,727,956 A | 3/1988 | Huizer | |
| 4,918,668 A * | 4/1990 | Sallas | ........................... 367/23 |
| 5,469,404 A | 11/1995 | Barber et al. | |
| 5,535,176 A * | 7/1996 | Yang | ........................... 367/24 |
| 5,724,306 A * | 3/1998 | Barr | ........................... 367/15 |

FOREIGN PATENT DOCUMENTS

| | | |
|---|---|---|
| GB | 2148503 | 5/1985 |
| GB | 2176605 | 12/1986 |
| WO | WO9706452 | 2/1997 |

OTHER PUBLICATIONS

International Search Report for PCT/GB00/03218 dated Nov. 24, 2000.

* cited by examiner

*Primary Examiner*—Ian J. Lobo (57) ABSTRACT

A method of seismic surveying comprises emitting seismic energy at two or more different depths during a sweep. In one embodiment, the depth of a seismic source is varied during a sweep, by raising or lower the source while it is emitting seismic energy. In another embodiment, an array of two or more marine vibrators is used as the source of seismic energy, with the vibrators in the array being disposed at different depths. The invention allows notch frequencies in the amplitude spectrum to be eliminated, and allows improvements in both the spectral flatness and the amplitude at low frequencies.

16 Claims, 10 Drawing Sheets

FIG 1

Amplitude spectrum of a 12m Ghost filter

FIG 2

Spectrum of Ghost filter : depth = 5 metres $Z = 5m$

FIG 3a

Spectrum of Ghost filter : depth = 50 metres

$Z = 50m$

FIG 3b 5-85Hz Sweep(a) v. Convolution
with 6m Ghost filter(b)

FIG 4

5-85Hz Sweep at 6m depth(a)v. convolution
with 0.5 dB/Hz Q filter(b)

5-85Hz Sweep at 6m depth (d)v.Optimisation for:
Low freq.Power(a),Spectral flatness (b),
Optimised summation(c)

FIG 8

5-85Hz Sweep at 6m depth (c)v.Unbiased summation (b) and Biased summation β=+0.5(a)

FIG 9

5-85Hz Sweep at 6m depth (b)v.Biased
optimisation summation (a)

METHOD OF SEISMIC SURVEYING, A MARINE VIBRATOR ARRANGEMENT, AND A METHOD OF CALCULATING THE DEPTHS OF SEISMIC SOURCES

The present invention relates to a method of marine seismic surveying, and in particular to a method in which seismic energy is emitted at different depths during a survey. The present invention also relates to a marine seismic surveying arrangement for carrying out such a method, and to a method of calculating the preferred depths for emitting seismic energy.

Figure 1:
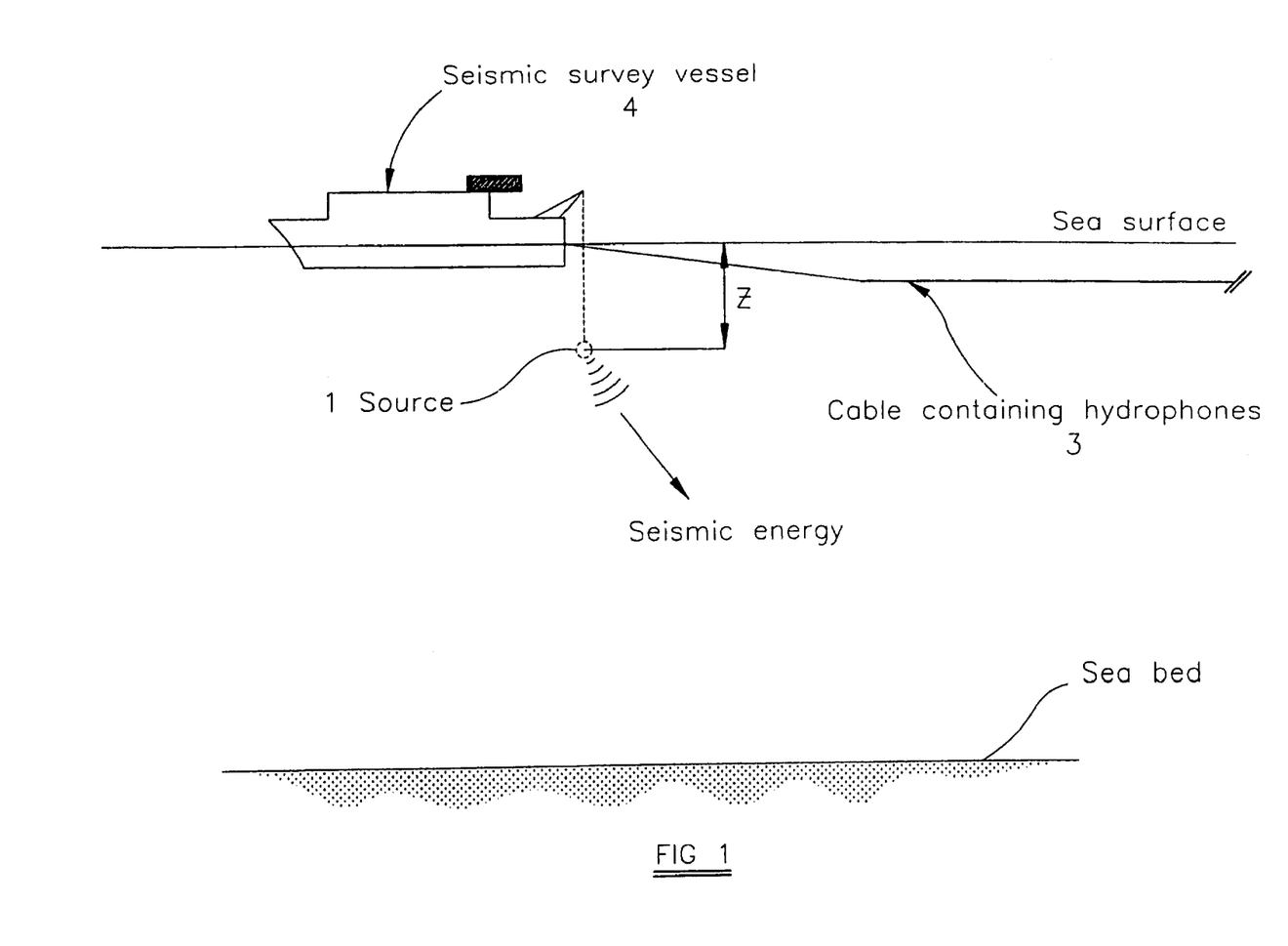
FIG. 1 is a schematic view of a conventional arrangement for a marine seismic survey.

The principle of marine seismic surveying is shown schematically in FIG. 1. Seismic energy is emitted in a generally downwards direction from a source of seismic energy 1, is reflected by the sea bed 2 and by the earth strata or geological structures beneath the sea bed, and is received by an array of seismic receivers 3 such as hydrophones. Analysis of the energy received at the receiving array 3 can provide information about the earth strata or geological structures beneath the seabed. The source of seismic energy 1 is suspended at a fixed depth z from a survey vessel 4.

One suitable source of seismic energy for use in marine seismic surveying is the marine vibrator. In operation, the frequency of seismic energy emitted by a marine vibrator is varied, or "swept", in a well-defined manner during each operation, or "sweep", of the vibrator. The construction and operation of this device is described in Baeten et al in "First Break" Vol 6, No. 9, pp. 285-294 (1988) and by Haldorsen et al in "Expanded abstracts of the Fifty Fifth Meeting of the Society of Exploration Geophysicists" pp. 509-511 (1985).

When marine vibrators are used as the source of seismic energy in marine seismic surveying, an array of vibrators distributed in a horizontal direction is generally used. The vibrators in the array are suspended at a fixed common depth beneath suitable floats. The array is towed behind the vessel at about 5 knots. The vibrators are distributed perpendicularly to the direction of tow and are operated periodically, for example every 20 seconds or so to produce their respective 8 to 15 second swept frequency outputs.

One problem associated with conventional marine seismic surveying using a marine vibrator as the seismic source is that the downwardly directed seismic wave is the sum of two signals. In addition to the direct signal from the vibrator (otherwise known as the "vibrator output"), there is also a reflected signal from the sea surface. The signal reflected from the sea surface, known as a "ghost" signal, is delayed relative to the direct signal. There are two components to this delay: firstly, there is a 180° phase change upon reflection at the sea surface and, secondly, there is a time delay corresponding to the additional path length (which for a signal emitted in the vertical direction is 2z, or twice the depth of the vibrator).

The actual vertical far field signal is the sum of the direct signal and the ghost signal. The direct signal and the ghost signal will interfere, and this causes variations in the amplitude of the far field signal. For some frequencies, the interference is destructive and causes a zero amplitude or "notch" in the spectrum. This occurs at frequencies where the depth of the source is an even number of quarter wavelengths:

$$f_{notch}=(nc/2z), n=0, 1, 2, 3 \ldots \quad (1)$$

In equation 1, c is the speed of sound in water, and n is an integer giving the harmonic order.

Constructive interference occurs at frequencies exactly intermediate adjacent notch frequencies, and this leads to maxima in the amplitude at these frequencies, given by:

$$f_{peak}=(2n+1)c/4z, n=0, 1, 2, 3 \ldots \quad (2)$$

The effect of the interference between the direct signal and the ghost signal can be thought of as applying a frequency domain "ghost filter" to the direct signal. The ghost filter has the following form:

$$g(f)=1+|r|^2-2|r|\cos(2zf/c) \quad (3)$$

In equation (3), r is the reflection coefficient at the sea surface. The amplitude spectrum of the ghost filter resembles a full-wave rectified sine wave, with zeros at the ghost notch frequencies and peaks of amplitude 2.0 (6 dB) at the peak frequencies.

Figure 2:
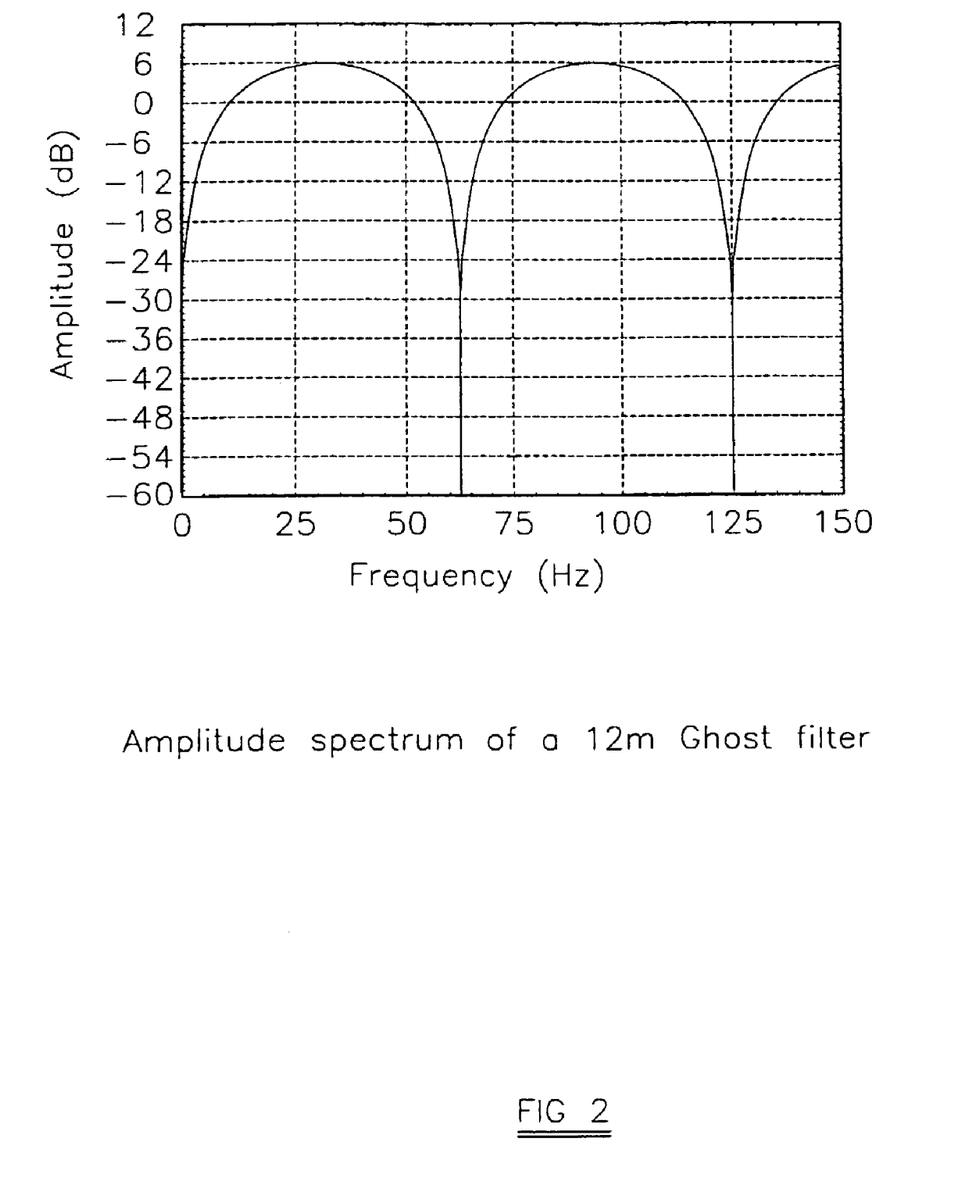
FIG. 2 shows the amplitude spectrum of a ghost filter corresponding to a depth of 12 m.

FIG. 2 shows the amplitude of a typical ghost filter as a function of frequency. This figure shows the ghost filter for the case z=12 m, c=1500 m/s, and with a reflection coefficient of −1.0 at the sea surface. It will be seen that the amplitude decreases to 0 at the notch frequencies of 0 Hz, 62.5 Hz, 125 Hz . . . , and that there are maxima in the amplitude at the peak frequencies of 31.25 Hz, 93.75 Hz . . .

The presence of maxima and minima in the far-field signal is undesirable. A further undesirable effect is the gradual roll-off that occurs near a notch frequency, and in particular near the zero-frequency end of the spectrum (a frequency of 0 Hz is always a notch frequency).

Figure 3A:
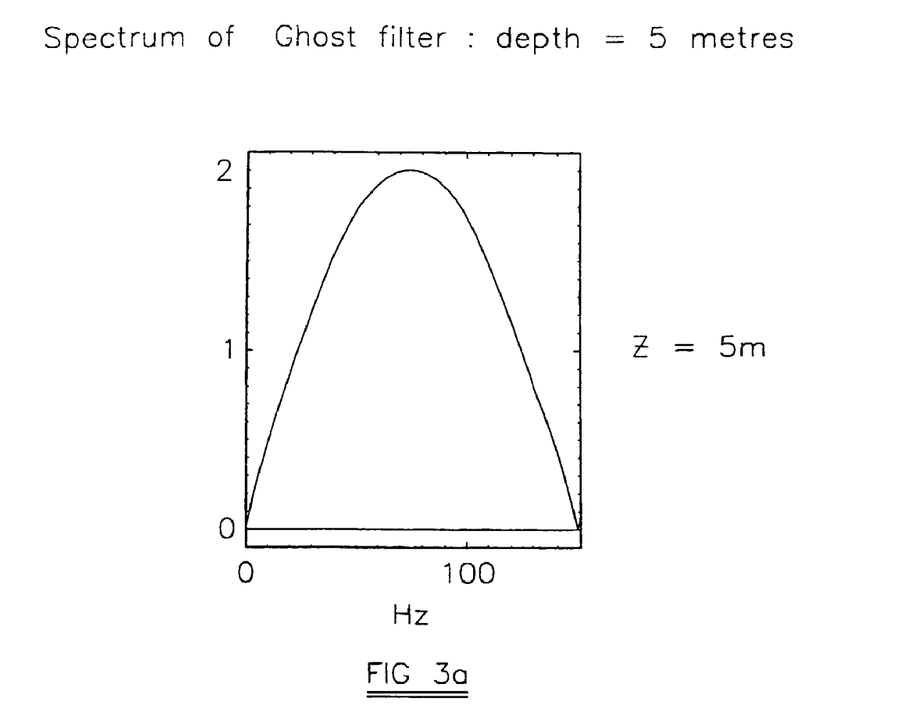
FIG. 3(a) shows the amplitude spectrum of a ghost filter corresponding to a depth of 5 m.

One conventional approach to mitigating the problems caused by the notch frequencies is to deploy the vibrator at a fixed depth which is chosen such that the first non-zero notch frequency is placed just above the top of the frequency band of interest during the survey. The ghost filter obtained in this case is shown in FIG. 3(a). This figure assumes that the depth of the seismic source is 5 m, which is a typical depth.

Although the ghost filter shown in FIG. 3(a) does not contain any notch frequencies within the spectrum, there is severe attenuation of the amplitude at frequencies below about 25 Hz and above about 125 Hz.

Figure 3B:
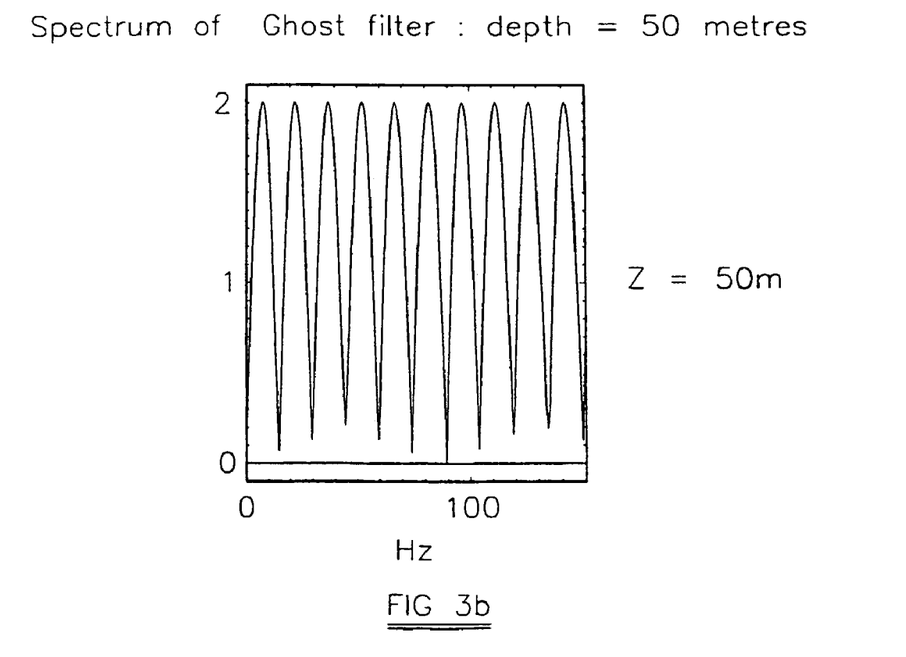
FIG. 3(b) shows the amplitude spectrum of a ghost filter corresponding to a depth of 50 m.

FIG. 3(b) shows the effect on the amplitude of the ghost filter when the depth of the source in FIG. 3(a) is increased from 5 m to 50 m. It is generally unsatisfactory to use a seismic source at such a depth, because notch frequencies occur around every 15 Hz. However, this approach does improve the low frequency response, for example at around 8 Hz.

Figure 4:
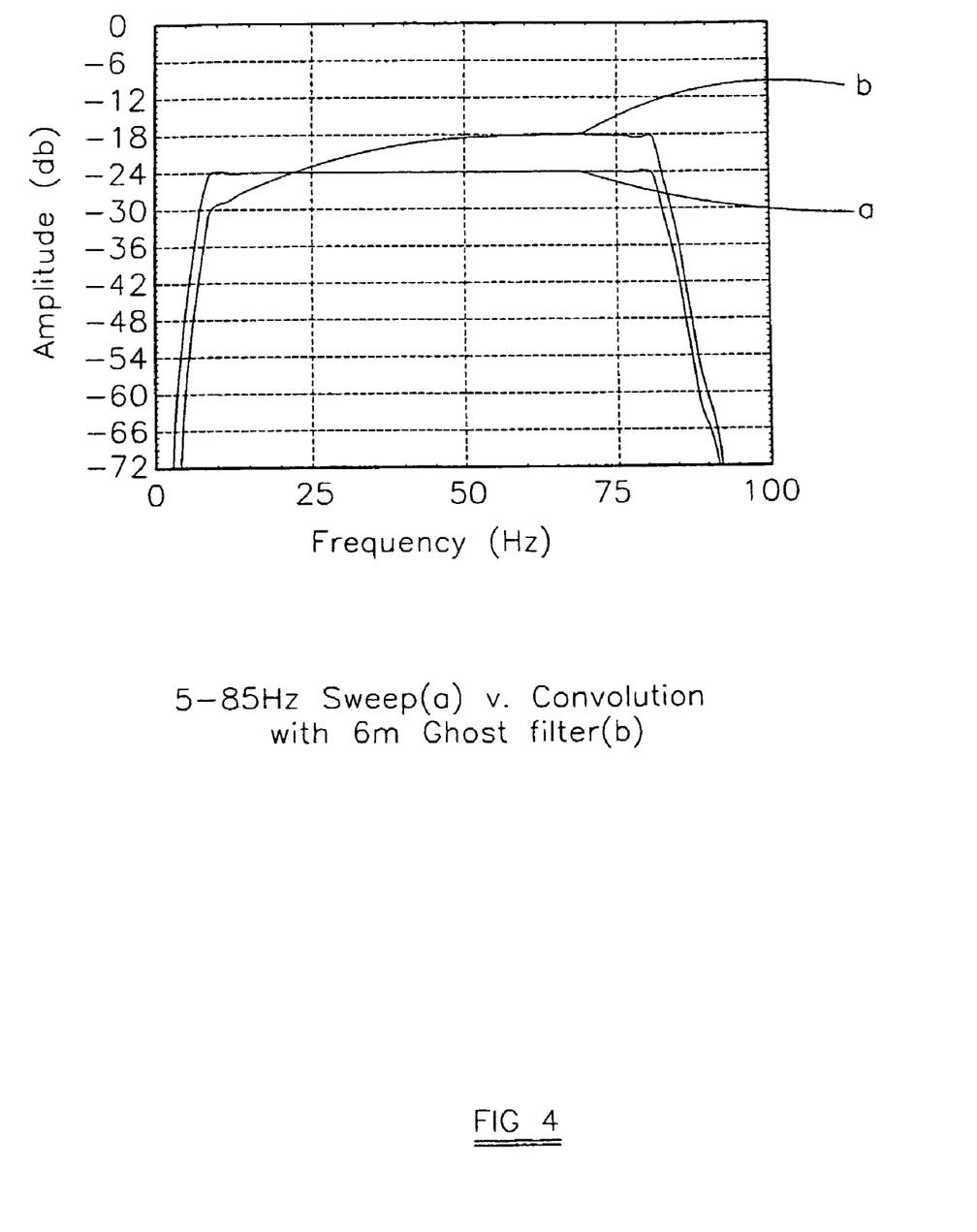
FIG. 4(a) shows the amplitude spectrum of a marine vibrator output.
FIG. 4(b) shows the effect of convolving the amplitude spectrum of FIG. 4(a) with a ghost filter.

A typical frequency range for a seismic survey is 5 to 85 Hz. FIG. 4 shows the effect of the "ghost filter" on the amplitude spectrum of an ideal linear seismic sweep. The trace (a) in FIG. 4 shows the amplitude spectrum of a marine vibrator output, and it will be seen that the amplitude is substantially constant between approximately 10 and 75 Hz.

The trace (b) in FIG. 4 shows the amplitude spectrum of the seismic energy after interference between the direct signal and the ghost signal. That is, trace (b) represents the results of filtering trace (a) using the 'ghost filter'. It has been assumed that the depth of the source is z=6 m, so that the "ghost filter" applicable in this case is the one shown in FIG. 2. More formally, trace (b) in FIG. 4 represents the convolution of the trace (a) in FIG. 4 with the ghost filter shown in FIG. 2. It will be noted that the amplitude of the seismic energy spectrum at low frequencies (5-20 Hz) has been attenuated as a result of the interference with the ghost signal—this is due to the presence of the 0 Hz notch frequency. Conversely, the amplitude at higher frequencies has been increased, by a maximum of 6 dB at a frequency of 62.5 Hz.

One prior art approach to overcoming the problem of this attenuation at low frequencies owing to the roll-off into the 0 Hz notch frequency is to use a seismic energy source having greater amplitude at low frequencies. This approach has been commonly used with air gun sources. However, it is difficult to increase the amplitude at low frequencies when the seismic source is a marine vibrator, owing to mechanical constraints within the marine vibrator (and specifically, displacement limitations at low frequencies). This prior art approach cannot, therefore, be applied to the case where the energy source is a marine vibrator.

A further problem with conventional marine seismic surveying is that the reflectivity of the seabed is not independent of frequency. It has been found that the reflectivity of the seabed decreases as the frequency of the seismic energy increases. This effect is known as "earth loss filtering".

Figure 5:
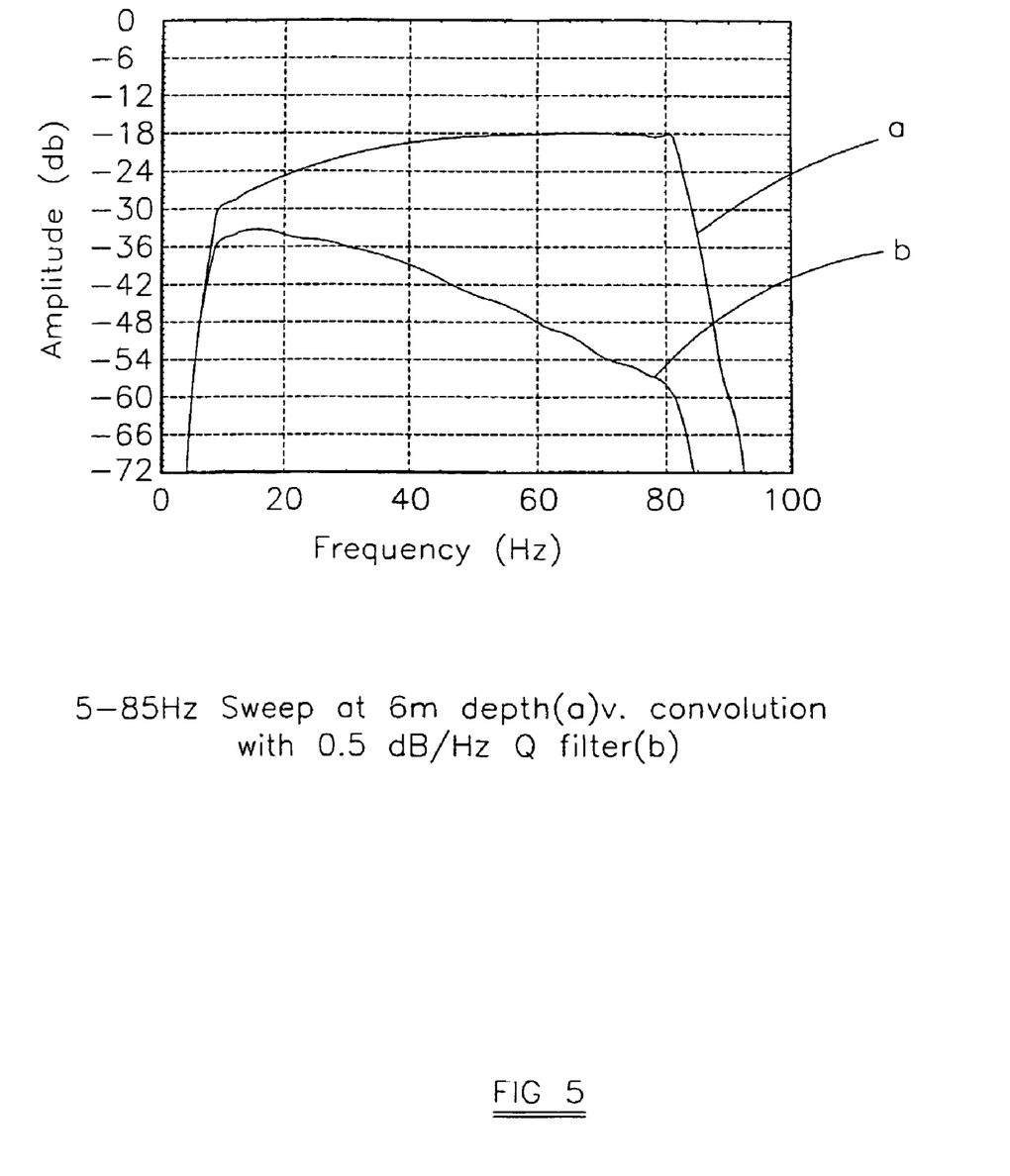
FIG. 5(a) shows the amplitude spectrum of a marine vibrator output after convolution with a ghost filter.
FIG. 5(b) shows the amplitude spectrum of FIG. 5(a) after convolution with an earth loss filter.

FIG. 5 shows the effect of earth loss filtering on a typical seismic energy spectrum.

In this example, the earth loss filtering is modelled by a Q-filter corresponding to a loss of 0.5 dB/Hz. Trace (a) in FIG. 5 shows the vibrator output after convolution with a ghost filter, and trace (b) shows the spectrum after earth loss filtering. It will be noted that the amplitude at high frequencies has been severely attenuated by the earth loss filter. In consequence, it is mainly the low frequency part of the energy spectrum that is left to provide useful information, and it is thus desirable to increase the amplitude of the low frequency part of the energy spectrum.

A first aspect of the present invention provides a method of seismic surveying using one or more marine vibrators, the method comprising emitting seismic energy at one or more different depths during a sweep.

According to the invention, during the course of a seismic sweep, seismic energy is emitted at two or more different depths. Energy emitted at one depth will have a different ghost filter from the energy emitted at another depth. It is accordingly possible to increase the amplitude of the energy spectrum at low frequencies.

In a preferred embodiment the method comprises emitting seismic energy from an array of marine vibrators, the array of marine vibrators comprising at least a first vibrator at a first depth and a second vibrator at a second depth greater than the first depth.

In an alternative preferred embodiment the method comprises varying the depth of a marine vibrator while the marine vibrator is emitting energy.

A second aspect of the present invention provides a seismic surveying arrangement comprising: a vessel; a source of seismic energy; and means for suspending the source of seismic energy from the vessel; wherein the source of seismic energy is an array of two or more marine vibrators, the array being suspended in use such that a first vibrator is disposed at a first depth and a second vibrator is disposed at a second depth greater than the first depth.

A third aspect of the present invention provides a method of calculating the preferred depths for seismic sources in an array of a plurality of seismic sources, the method comprising the steps of:

a) assigning a depth to each seismic source in the array;
b) for each seismic source in the array, obtaining the amplitude spectrum of seismic energy emitted by the seismic source;
c) summing the results of step (b) to obtain the amplitude spectrum of seismic energy emitted by the array of seismic sources; and
d) generating a parameter indicative of a property of the amplitude spectrum of seismic energy emitted by the array of seismic sources.

A fourth aspect of the present invention provides a seismic surveying arrangement comprising: a vessel; a marine vibrator; means for suspending the marine vibrator from the vessel; a first control means for causing the marine vibrator to emit seismic energy; and a second control means for varying the depth of the marine vibrator.

Preferred features of the invention are set out in the dependent claims.

Preferred embodiments of the present invention will now be described by way of illustrative examples, with reference to the accompanying figures in which.

In one embodiment of the invention, the seismic source consists of a single marine vibrator, or of an array of marine vibrators arranged at a common depth. In this embodiment, emission of seismic energy at two or more depths is achieved by varying the depth of the marine vibrator(s) during a sweep.

Typically, a marine vibrator is used to generate a signal that sweeps in frequency across a frequency band of interest. In this embodiment of the invention, the depth of the vibrator, or array of vibrators, is varied during the sweep such that constructive interference, or partial constructive interference, is obtained during the whole duration of the sweep.

Figure 6:
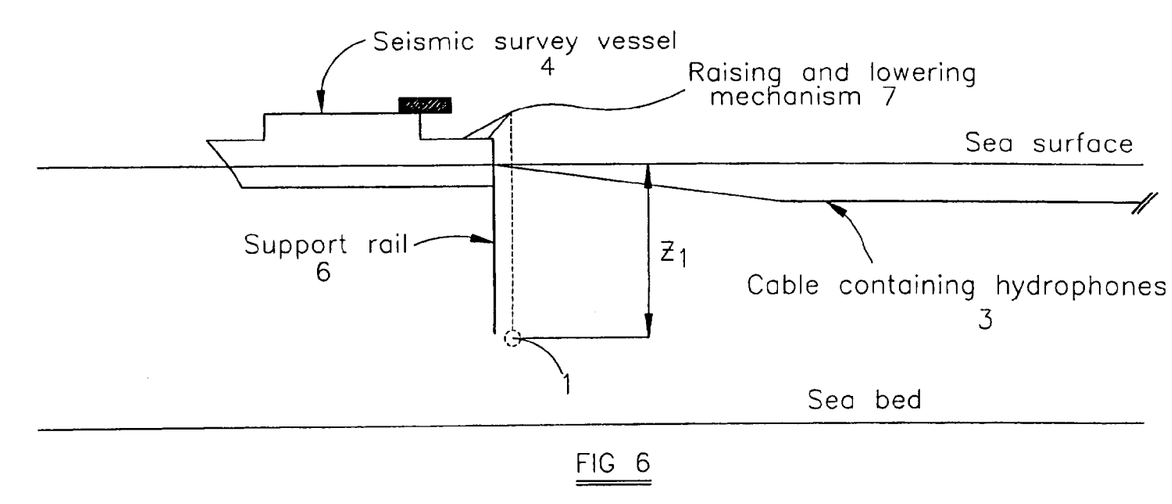
FIG. 6 shows a marine seismic surveying arrangement of one embodiment of the invention at the start of a sweep.
Figure 7:
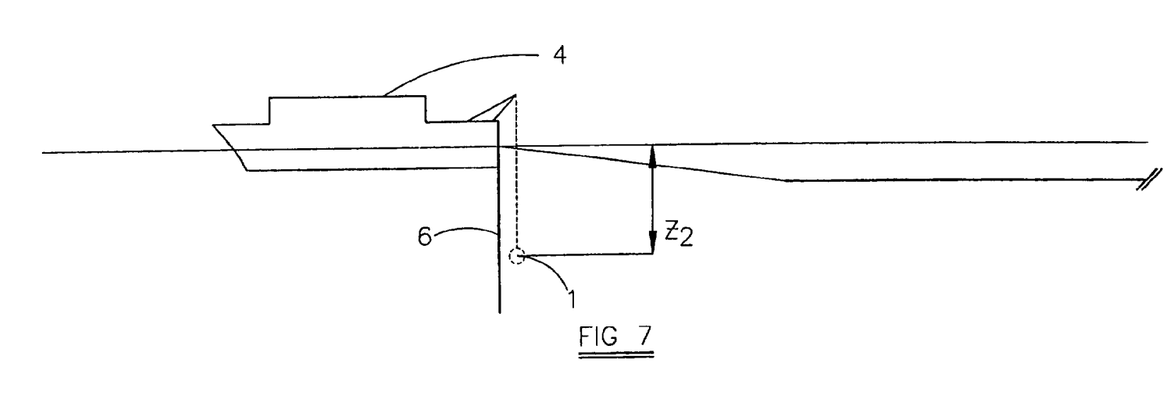
FIG. 7 shows the marine seismic surveying arrangement of FIG. 6 at the end of a sweep.

FIGS. 6 and 7 illustrate a marine seismic surveying arrangement at the start of a sweep according to this embodiment of the invention and at the end of a sweep according to this embodiment of the invention. In FIG. 6, the vibrator is at a large depth $z_1$, at the start of a sweep. As the sweep progresses, the depth of the vibrator is decreased, reaching a minimum depth $z_2$ at the end of the sweep as shown in FIG. 7.

In one preferred embodiment, the depth of the vibrator is varied as the frequency of energy emitted from the vibrator is varied such that the ratio between the depth of the vibrator and the wavelength of the energy being emitted is substantially constant. The ratio is preferably set to a value that provides constructive interference between the direct signal and the ghost signal. This can be achieved, for example, by setting the depth of the vibrator to be always approximately equal to one quarter of the wavelength of the energy being emitted.

If the sweep is, for example, from 7.5 Hz to 75 Hz, then the depth of the vibrator could initially be approximately 50 m. During the sweep the vibrator is mechanically raised, and it would reach a depth of around 5 m at the end of the sweep. Once a sweep has been completed, the vibrator is lowered again to its starting depth, ready for a subsequent sweep.

Varying the depth of the vibrator such that constructive interference occurs at all frequencies during the sweep leads to an increased amplitude at all frequencies. It is possible to double the amplitude at all frequencies in this way.

When processing seismic data obtained using a swept-depth source of the present invention, it is necessary to allow for the variation in depth during the processing. This does not present any significant problem, and conventional methods of long-sweep deconvolution may be employed provided that the source signature estimation method correctly includes the movement of the seismic energy source.

A conventional seismic survey vessel is equipped with a mechanism 7 for lowering a seismic energy source into the water, and for subsequently removing it from the water upon completion of the survey. It will also have a control means for operating the seismic source. All that is required in order to put the present invention into effect is to provide the raising/lowering mechanism 7 with a suitable control means (not shown) for continually varying the depth of the marine vibrator during a sweep. Where the raising/lowering mechanism is computer-controlled, for example, this can be done simply by programming the computer to raise the seismic source in a predetermined manner. For example, the vibrator could be raised at a predetermined, constant rate, or it could be raised at a rate chosen such that the depth of the vibrator is a constant ratio to the wavelength of the energy being emitted by the vibrator.

In order to facilitate keeping the ratio between the depth of the vibrator and the wavelength of the energy emitted from the vibrator substantially constant, it is possible to use a single control means to control both the emission of energy from the vibrator and the depth of the vibrator. For example, a suitably programmed computer could control the raising/lowering mechanism and also control the wavelength of energy emitted from the vibrator.

A marine vibrator typically has a mass of several tons. The boat 4 is therefore preferably provided with a support rail 6 to guide the vibrator when it is lifted during a sweep.

This embodiment of the present invention is not limited to use with a single seismic source. It is common for a marine seismic survey to be carried out using a lateral array of seismic sources, for example a linear array of 6 vibrator units arranged at a common depth. It would be possible to carry out the invention using such an array of seismic sources, with the depth of the array being varied during a sweep. This would enable all the advantages of the use of a lateral array of seismic sources to be retained, as well as achieving the advantages of the present invention.

In a second embodiment of the invention, emission of seismic energy at different depths during a sweep is obtained not by varying the depths of the source(s) during a sweep, but by using a vertical array of two or more marine vibrators. This embodiment of the invention again enhances the amplitude of the low-frequency energy spectrum of the signal obtained by interference between the direct signal and the ghost signal, while retaining the amplitude at high-frequencies.

One example of this embodiment of the invention uses a marine vibrator array having 6 vibrators. When the array is in use, three of the vibrators are deployed at a depth of 12 m, and three at a depth of 6 m. The vibrators at a depth of 12 m have a notch frequency at 62.5 Hz and have peak frequencies at 31.25 Hz and 93.75 Hz. The vibrators arranged at a depth of 6 m have a ghost frequency at 125 Hz, and have a peak frequency at 62.5 Hz. Thus, a peak frequency of the vibrators at a depth of 6 m is coincident with, and compensates for, a notch frequency of the vibrators at a depth of 12 m. The resultant amplitude spectrum of the overall signal of this array (that is, the combination of the direct signal and the ghost signal) demonstrates both the high amplitude at low frequencies associated with the vibrators at a depth of 12 m, but retains the high frequency response of the vibrators at a depth of 6 m.

It should be noted that reconfiguring the array from a horizontal array of 6 vibrators to a vertical array having three vibrators at a depth of 6 m and three vibrators at a depth of 12 m has not changed the total energy that is emitted by the array. The energy has, however, been redistributed within the spectrum of the overall signal, to improve the low-frequency amplitude while having minimal effect on the amplitude at high frequencies.

In the above example, although the array included 6 vibrators they were positioned at only two different depths. In a vertical array of 6 vibrator units it is, however, possible to position units at different depths so as to optimise the energy spectrum of the output signal. The two principal characteristics to consider are the low-frequency amplitude, and the flatness of the amplitude of the spectrum from the first peak position to the highest frequency required in the survey (hereinafter the "spectral flatness").

Calculation of the output spectrum of a vertical array of 6 vibrators is straightforward in principle. It is first necessary to calculate the amplitude spectrum of the ghost filter for each vibrator using equation (3). The 6 separate spectra, one for each vibrator, are then summed to arrive at the overall spectrum of the array.

Once the overall spectrum has been computed for the array, its properties can be investigated by calculating one or more parameters of the overall amplitude spectrum. For example, the overall amplitude spectrum can be integrated between, for example, 10 and 35 Hz to establish the low-frequency amplitude. It is alternatively possible to calculate the inverse of the standard deviation of the amplitude spectrum between, for example, 25 and 80 Hz in order to calculate the spectral flatness. As a further alternative, a parameter indicative of both the spectral flatness and the amplitude at low frequencies could be calculated. (The bandwidths 10 to 35 Hz and 25 to 80 Hz given in the above example are chosen as examples, and can be adjusted to conform to the requirements of any particular survey).

Once the value of a parameter has been calculated for one set of depths for the vibrators, the depth of one or more of the vibrators is changed, the overall amplitude spectrum re-calculated, the parameter re-calculated, and its value for the new depths compared with its previous value. This procedure is then repeated for every possible combination of depths for the vibrators or, alternatively, until a combination of depths that gives an acceptable value for the parameter is obtained.

The optimisation is performed on combinations of ghost filters, and is independent on the vibrator sweep signature. This is acceptable because convolution and super-position are commutative relations—that is:

$$\{g_1(t)*s(t)\}+\{g_2(t)*s(t)\}+\{g_3(t)*s(t)\}+\{g_4(t)*s(t)\}+\\\{g_5(t)*s(t)\}+\{g_6(t)*s(t)\}$$

$$=s(t)*\{g_1(t)+g_2(t)+g_3(t)+g_4(t)+g_5(t)+g_6(t)\} \quad (4)$$

In equation (4), $g''(t)$ represents the time-domain ghost filter associated with the $n^{th}$ vibrator unit, $s(t)$ is the time domain sweep signature, and the * represents convolution in the time domain. The optimisation is independent of the sweep signature, so that the bandwidth over which the optimisation norms are calculated should be set to be within the bandwidth of the sweep.

In some cases, it is possible to choose the depths of the marine vibrator so as to maximise a single parameter such as the amplitude at low frequencies or the spectral flatness. More generally, however, the amplitude at low frequencies and the spectral flatness are both important, and it is necessary to choose the depths of the marine vibrators to provide acceptable values for both these parameters. In this case, once the values for the two parameters have been calculated, they are scaled within their respective ranges. The scaled values are then added together, and the depths of the vibrators are chosen to maximise the value of this sum.

In an example, the array has 6 marine vibrators. The depth of each of the vibrators is allowed to vary between 1 m and 15 m, in steps of 1 m. This gives a total of 38760 unique depth combinations.

The process of calculating the amplitude spectra for each one of these depth combinations, calculating the values of the two parameters of low frequency amplitude and spectral flatness for each combination, and choosing the optimal array configuration takes only a few minutes to run on a desk top computer.

Table 1 illustrates examples of the results of the optimisation process.

TABLE 1

| Optimisation Parameter | Depth of Vibrator Number: | | | | | |
|---|---|---|---|---|---|---|
| | 1 | 2 | 3 | 4 | 5 | 6 |
| Low-Frequency Amplitude (10-35 Hz) | 15 m | 15 m | 15 m | 15 m | 15 m | 15 m |
| Spectral Flatness (25-85 Hz) | 2 m | 6 m | 7 m | 7 m | 11 m | 15 m |
| Optimised Sum | 7 m | 7 m | 7 m | 7 m | 12 m | 15 m |

Figure 8:
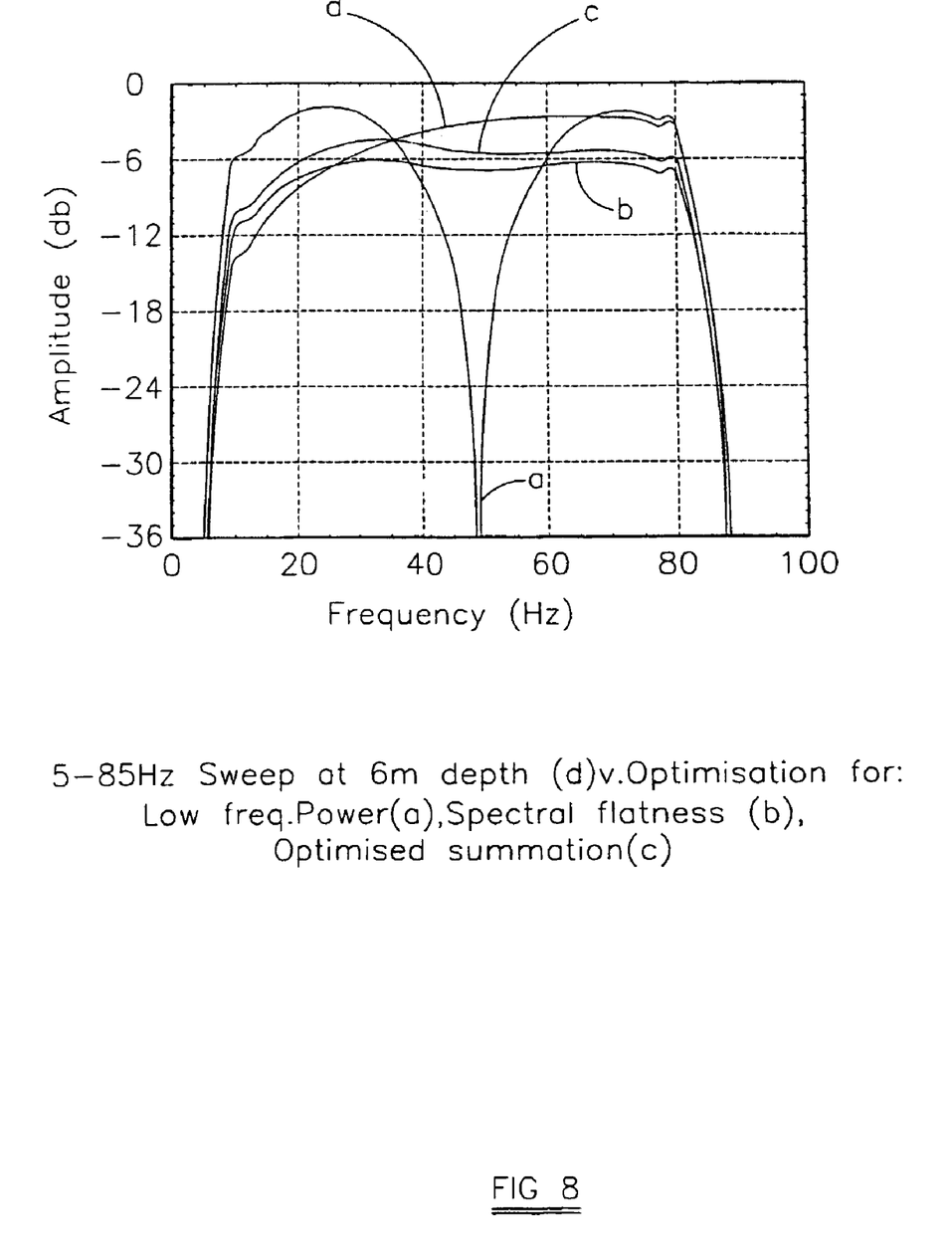
FIG. 8(a) shows the amplitude spectrum for an array of six marine vibrators at depths chosen to maximise the amplitude at low frequency.
FIG. 8(b) shows the amplitude spectrum for an array of six vibrators at depths chosen to maximise spectral flatness.
FIG. 8(c) shows the amplitude spectrum of an array of marine vibrators at depths chosen to optimise the amplitude at low frequency and the spectral flatness.
FIG. 8(d) shows the amplitude spectrum for a conventional array of six vibrators at a depth of 6 m.

The overall output spectra calculated for the 3 arrays shown in table 1 are shown in FIG. 8, as traces (a), (b) and (c) respectively. Trace (d) in FIG. 8 shows the overall amplitude spectrum for a horizontal array having 6 vibrator units all at a depth of 6 m, for comparison.

The first array given in table 1 shows that the amplitude at low frequencies is, as expected, maximised by placing all 6 vibrators at the lowest possible depth of 15 m. This arrangement is, however, unsatisfactory as regards the flatness of the spectrum, since it creates a notch frequency at approximately 50 Hz as shown in trace (a) of FIG. 8.

The overall spectrum of the second configuration given in table 1 is shown as trace (b) in FIG. 8, and it will be seen that this does indeed achieve good spectral flatness over most of the range between 25 to 85 Hz, although there is some tailing off above 80 Hz. It will be seen, however, that the amplitude at low frequencies falls away markedly. This is, of course, to be expected since depths of the vibrators were chosen to maximise the spectral flatness, without consideration of the low-frequency amplitude.

Trace (c) in FIG. 8 shows the results for the third vibrator configuration of table 1, in which the depths of the vibrators have been chosen to optimise both the amplitude at low frequency and the flatness of the spectrum. It will be seen that the spectrum produced by this arrangement has a greater amplitude at low frequencies than trace (b), at the expense of a slight deterioration in the flatness of the spectrum over the range 25-80 Hz.

It will be seen that trace (c) clearly has greater amplitude at low frequencies and an improved spectral flatness compared with the spectrum shown in trace (d) for a conventional horizontal array of 6 vibrators all at a depth of 6 m.

The above results show that, by moving an array of six marine vibrators from a depth of 6 m to a depth of 15, the amplitude in the frequency range 10-35 Hz increases by up to 6 dB. At higher frequencies, the amplitude of the spectrum of the array at a depth of 15 m falls off because of the 50 Hz ghost notch. The array in which the depths of the vibrators are chosen to maximise the spectral flatness shows an increase of 0-3 dB over the conventional array at a depth of 6 m in the frequency range 10-25 Hz. Above this frequency range, the amplitude of the overall spectrum varies by less than 1 dB while the conventional array at a depth of 6 m increases by 4 dB owing to the presence of the peak frequency at 62.5 Hz. The array configuration in which the depths of the vibrators are chosen so as to optimise both the amplitude at low frequencies and the spectral flatness shows an increase in amplitude of up to 4 dB between 10 and 35 Hz. The amplitude of the spectrum varies only fractionally more than that of the array in which the depths are chosen specifically to maximise the spectral flatness.

The positions of the vibrators in the third array shown in table 1 are obtained by summing the optimisation norms for the low frequency amplitude and the spectral flatness. Although each of the optimisation norms has been scaled within its own range, this is not sufficient to eliminate bias in the summation process. If the distribution of one of the optimisation parameters within its range is non-linear, then the resultant summation will be biased towards one of the parameters. It will be seen in FIG. 8 that the optimised amplitude, trace (c), appears to be biased towards the spectral flatness characteristic in preference to the low-frequency amplitude.

In a preferred embodiment of the invention, therefore, a bias factor is applied in the summation process. A simple linear bias factor is applied in the optimisation, and this can be set to a value between −1 and 1 to bias the summation towards the spectral flatness characteristic or towards the low-frequency amplitude characteristic. The bias takes the form of:

$$\beta=0, \xi=F_N+L_N$$

$$1 \geq \beta 0, \xi=F_N(1-\beta)+L_N$$

$$-1 \leq \beta 0, \xi=F_N+L_N(1-|\beta|) \quad (5)$$

In Equation 5, $F_N$ and $L_N$ represent the normalised spectral flatness and the normalised low-frequency amplitude respectively. $\beta$ is the bias coefficient, and $\xi$ is the optimisation sum.

The optimisation process was repeated using a bias coefficient of $\beta=+0.5$ in an attempt to improve the amplitude at low frequency. The results are shown in table 2.

TABLE 2

| Optimisation Parameter | Depth of Vibrator Number: | | | | | |
|---|---|---|---|---|---|---|
| | 1 | 2 | 3 | 4 | 5 | 6 |
| Low-Frequency Amplitude (10-35 Hz) | 15 m | 15 m | 15 m | 15 m | 15 m | 15 m |
| Spectral Flatness (25-85 Hz) | 2 m | 6 m | 7 m | 7 m | 11 m | 15 m |
| Optimised Biased Sum ($\beta = +0.5$) | 7 m | 7 m | 8 m | 11 m | 15 m | 15 m |

The array shown in the first row of table 2 is the array that maximises the amplitude at low frequency, and the array shown in the second row provides the best spectral flatness. These arrays are the same as the arrays shown in the first two rows of table 1.

The array set out in the third row of table 2 is not, however, the same as the array shown in the third row of table 1, as a result of introducing the bias factor into the summation.

Figure 9:
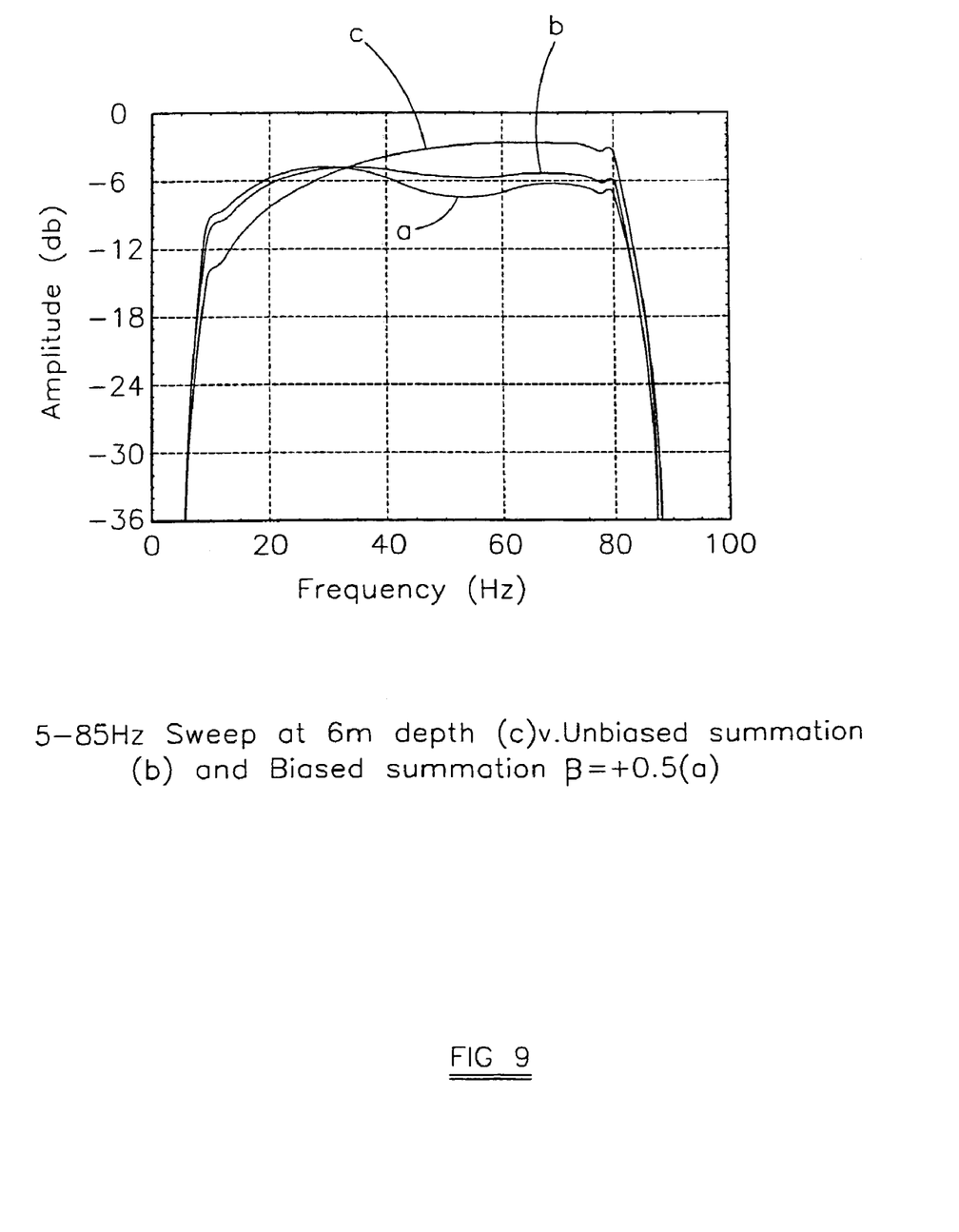
FIG. 9(a) shows the amplitude spectrum of an array of six marine vibrators at depths chosen to optimise the amplitude at low frequency and the spectral flatness using a biased summation.
FIG. 9(b) shows the amplitude spectrum of an array of six marine vibrators at depths chosen to optimise the low frequency amplitude and the spectral flatness using an unbiased summation.
FIG. 9(c) shows the amplitude spectrum of a conventional array of six vibrator units at a depth of 6 m.

FIG. 9 shows the overall amplitude spectrum of the signal (that is, the combination of the direct signal and the ghost signal) of the array of the third row of table 2. This is shown as trace (a). The amplitude spectrum of the array of the third row of table 1 is shown for comparison as trace (b), and the amplitude spectrum for a conventional horizontal array of 6 vibrators all at a depth of 6 m is shown for comparison as trace (c). It will be seen that introducing a bias coefficient of $\beta=+0.5$, which reduces the weight of the spectral flatness during the summation process, has indeed resulted in a greater amplitude at low frequencies (10-35 Hz). The amplitude at low frequencies of the spectrum of the "biased" array is increased by up to 2 dB compared with the amplitude of the "unbiased" array, and by up to 5 dB compared with the conventional horizontal array at a depth of 6 m.

Figure 10:
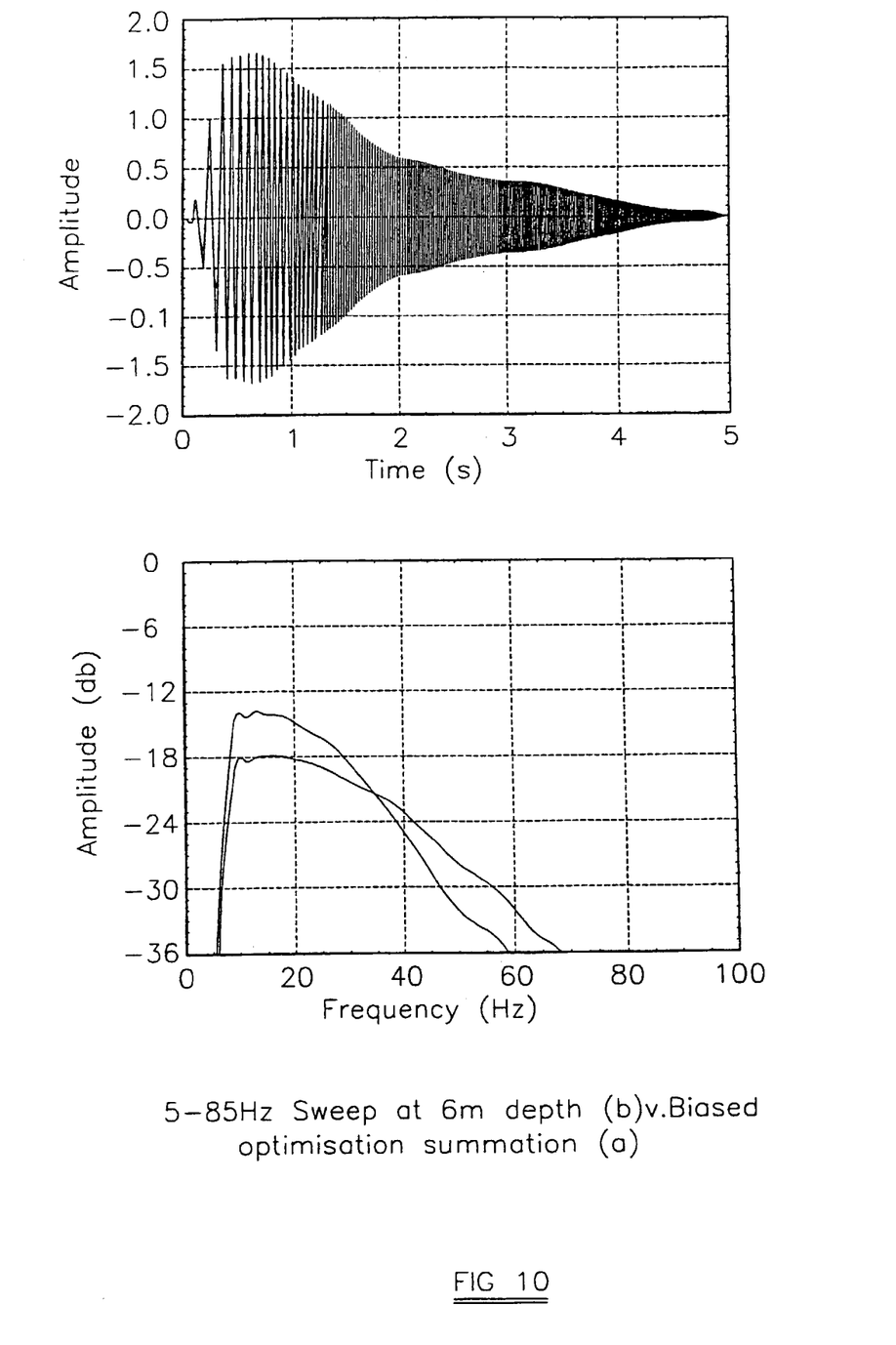
FIG. 10(a) shows the trace of FIG. 9(a) after convolution with an earth loss filter.
FIG. 10(b) shows the convolution of the trace of FIG. 9(d) with an earth loss filter.

Trace (a) of FIG. 10 shows the results of convolving trace (a) of FIG. 9 with a 0.5 dB/Hz earth loss filter. Trace (b) shows the amplitude spectrum for a conventional horizontal array of 6 vibrators each at a depth of 6 m after convolution with a 0.5 dB/Hz earth loss filter. The increased amplitude at low frequencies is readily evident in FIG. 10.

It has been found that increasing the bias coefficient above $\beta+0.5$ produces only a marginal increase in the amplitude at low frequency, but leads to a very severe loss of spectral flatness. It is therefore undesirable to use a bias factor significantly greater than $\beta=+0.5$.

The spectra of the vibrator arrays described in tables 1 and 2 were calculated using the assumption that the reflection coefficient at the sea surface is −1.0. It has however, been suggested that the reflection coefficient at the sea surface is typically lower than this, owing to the effect of the sea surface not being flat. For example, a more accurate value for the reflection coefficient at the sea surface might be between −0.85 and −0.80 for normal sea conditions under which seismic data are generally acquired.

Table 3 illustrates the results of varying the reflection coefficient at the sea surface between −1.00 and −0.05, in increments of 0.05. The results of table 3 were calculated using a bias coefficient of $\beta=+0.5$. The first row of table 3 therefore corresponds exactly to the third row of table 2.

TABLE 3

| Reflection Coefficient | Depth of Vibrator Number: | | | | | |
|---|---|---|---|---|---|---|
| | 1 | 2 | 3 | 4 | 5 | 6 |
| −1.00 | 7 m | 7 m | 8 m | 11 m | 15 m | 15 m |
| −0.95 | 7 m | 7 m | 8 m | 11 m | 15 m | 15 m |
| −0.90 | 7 m | 7 m | 8 m | 11 m | 15 m | 15 m |
| −0.85 | 7 m | 7 m | 8 m | 11 m | 15 m | 15 m |
| −0.80 | 7 m | 7 m | 8 m | 11 m | 15 m | 15 m |
| −0.75 | 7 m | 7 m | 8 m | 11 m | 15 m | 15 m |
| −0.70 | 7 m | 7 m | 8 m | 11 m | 15 m | 15 m |
| −0.65 | 7 m | 7 m | 8 m | 11 m | 15 m | 15 m |
| −0.60 | 7 m | 7 m | 8 m | 11 m | 15 m | 15 m |
| −0.55 | 8 m | 9 m | 9 m | 15 m | 15 m | 15 m |
| −0.50 | 8 m | 8 m | 9 m | 15 m | 15 m | 15 m |
| −0.45 | 8 m | 8 m | 9 m | 15 m | 15 m | 15 m |
| −0.40 | 8 m | 8 m | 9 m | 15 m | 15 m | 15 m |
| −0.35 | 8 m | 8 m | 9 m | 15 m | 15 m | 15 m |
| −0.30 | 8 m | 8 m | 9 m | 15 m | 15 m | 15 m |
| −0.25 | 8 m | 8 m | 9 m | 15 m | 15 m | 15 m |
| −0.20 | 8 m | 8 m | 9 m | 15 m | 15 m | 15 m |
| −0.15 | 8 m | 8 m | 9 m | 15 m | 15 m | 15 m |
| −0.10 | 8 m | 8 m | 9 m | 15 m | 15 m | 15 m |
| −0.05 | 8 m | 8 m | 9 m | 15 m | 15 m | 15 m |

It will be seen that the calculated positions of the vibrators in the vertical vibrator array are relatively insensitive to the magnitude of the reflection coefficient at the sea surface, particularly within the range of the coefficient that is associated with typical conditions for a marine seismic survey.

The process for calculating the amplitude spectrum of the vertical array of vibrators of the invention has ignored interactions between vibrator units. This assumption is believed to be reasonable, since it has been reported that vibrator units interact only very weakly.

Although the vertically distributed vibrator array described above contains 6 marine vibrators, the invention is not limited to an array of 6 vibrators. An array can in principle have any number of vibrators above two, and preferably has between 4 and 6 vibrators.

A conventional horizontal vibrator array consisting of a number of vibrator units arranged in a horizontal line is operated such that it is oriented perpendicular to the direction of emission of seismic energy. The directivity of a conventional horizontal array is such that constructive interference occurs most efficiently along a vertical in-line plane (that is, a vertical plane that is perpendicular to the array and is parallel to the central direction of emission of seismic energy. Secondary constructive anti nodes are formed along planes that are parallel to the in-line direction, but which are offset in the cross-line direction. Partial or complete destructive interference occurs at all other azimuths and take-off angles. The output signature of the vibrator array is extremely stable with regard to take-off angle within the in-line plane.

Reconfiguring the array, to a vertical array of the type used in the present invention, will have a significant effect on the directivity of the array. The primary plane of constructive interference would not longer be a vertical plane, but would be a horizontal plane passing through the mean depth of the array. The output signature of the array will vary significantly with take-off angle.

Figure 11:
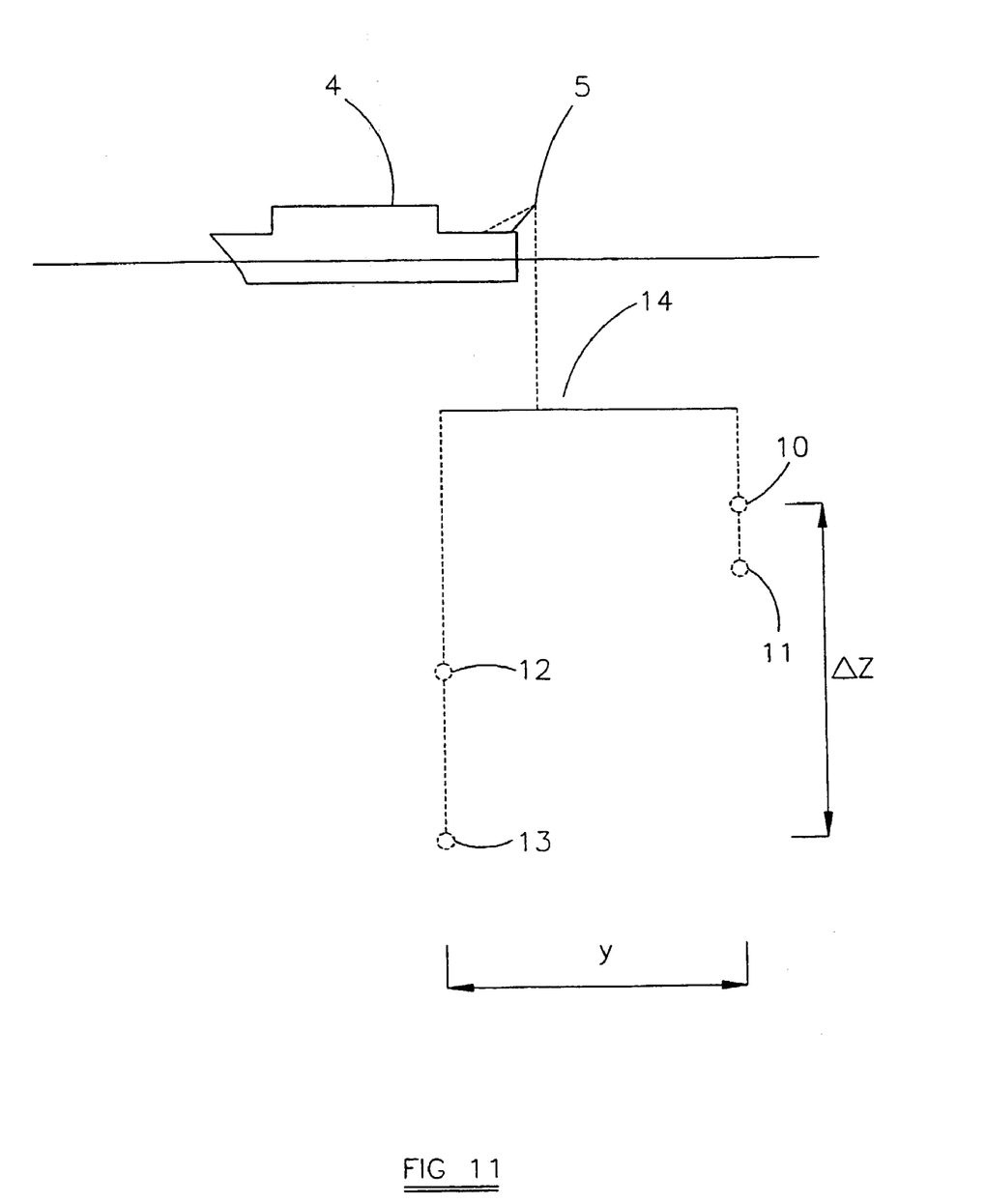
FIG. 11 is a schematic illustration of a marine seismic surveying arrangement according to another embodiment of the present invention.

In a further embodiment of the invention, the marine vibrators in the array are not arranged exactly one above the other, but the vibrator units mounted at shallow depths are placed further back from the vessel than the vibrator units at greater depths. For example, in an array with vibrators at depths of 7 m, 7 m, 8 m, 11 m, 15 m, and 15 m, the vibrators 10 at a depth of 7 m and the vibrator 11 at a depth of 8 m could be arranged further back from the vessel 4 than the vibrator 12 at a depth of 11 m and the vibrators 13 at a depth of 15 m. This can be done simply by suspending a boom 14 from the vessel's raising/lowering mechanism 5, and suspending the vibrators at shallow depths from one end of the boom 14 and the vibrators at greater depths from the upper end of the boom 14.

It is possible for the lateral separation y between the vibrators of the array to be greater than the difference in depth z between the shallowest vibrator 10 and the deepest vibrator 13. This would reduce the problem of the variation of the output sweep signature with the take-off angle.

Introducing a vertical separation between the marine vibrators in an array has the effect of introducing a phase shift between the energy emitted from two vibrators at different depths. In order to prevent such a phase shift occuring, in one embodiment of the invention the start time of the sweep of the deeper marine vibrators is delayed compared to the start time of the sweep of the shallower vibrator units. The delay time is preferably substantially equal to the time taken for seismic energy emitted by the shallower vibrators to reach the deeper vibrators, so that the deeper marine vibrators begin their sweep at the same time as the energy emitted by the shallower marine vibrators at the start of their sweep reaches the deeper vibrators. The phase shift between the deeper vibrators and the shallower vibrators is thus eliminated.

In the case of the array shown in FIG. 11, the two vibrators 10 at a depth of 7 m would be the first marine vibrators to be swept. The start of the sweep of the vibrator 11 at a depth of 8 m would be delayed by approximately the time taken for seismic energy emitted from the vibrators 10 at a depth of 7 m to travel 1 m and reach the vibrator 11 at a depth of 8 meters.

Similarly, the start of the sweep of the marine vibrator 12 at a depth of 11 m would be delayed, relative to the start of the sweep of the two vibrators 10 at a depth of 7 m, by approximately the time taken for seismic energy emitted from the upper vibrators 10 to travel a distance of 4 m, and the start of the sweep of the vibrators 13 at a depth of 15 m will be delayed, again relative to the start of the sweep of the vibrators 10 at a depth of 7 m, by approximately the time taken for seismic energy to travel a distance of 8 m.

In an alternative embodiment of the invention, the sweeps of all the marine vibrators in the array are started at the same time, and the effects of the phase difference between energy emitted from vibrators at different depths is taken into account during the analysis of the recorded data. This is done by correlating the recorded data separately for the individual vibrators in the array, and including phase differences appropriate to the different depths of the vibrators in the array in the subsequent processing of the data.

The invention claimed is:

1. A method of seismic surveying using one or more marine vibrators, the method comprising:
    emitting seismic energy at two or more different depths during a sweep; and
    determining the preferred depths, the determination including:
        a) assigning a depth to each seismic source in the array;
        b) for each seismic source in the array, obtaining the amplitude spectrum of seismic energy emitted by the seismic source;
        c) summing the results of step (b) to obtain the amplitude spectrum of seismic energy emitted by the array of seismic sources; and
        d) generating a parameter indicative of a property of the amplitude spectrum of seismic energy emitted by the array of seismic sources.

2. A method as claimed in claim 1 and comprising emitting seismic energy from an array of marine vibrators, the array of marine vibrators comprising at least a first vibrator at a first depth and a second vibrator at a second depth greater than the first depth.

3. A method as claimed in claim 2 wherein the first vibrator of the array is displaced with respect to the second vibrator in the direction of emission of seismic energy.

4. A method as claimed in claim 2 or 3 and further comprising starting emission of seismic energy from the second vibrator a pre-determined time after starting emission of seismic energy from the first vibrator.

5. A method as claimed in claim 4 wherein the pre-determined time is substantially equal to the time taken for seismic energy emitted from the first vibrator to reach the second vibrator.

6. A method of seismic surveying using one or more marine vibrators, the method comprising:
    emitting seismic energy at two or more different depths during a sweep; and
    varying the depth of a marine vibrator while the marine vibrator is emitting seismic energy.

7. A method as claimed in claim 6 and further comprising the step of varying the frequency of the seismic energy emitted from the marine vibrator.

8. A method as claimed in claim 7 wherein the frequency of the seismic energy emitted from the marine vibrator is varied such that the ratio of the depth of the marine vibrator to the wavelength of the seismic energy emitted from the marine vibrator is substantially constant.

9. A method as claimed in claim 8 wherein the ratio of the depth of the marine vibrator to the wavelength of the seismic energy emitted from the marine vibrator is approximately one quarter.

10. A method as claimed in any of claims 6 to 9 wherein the depth of the marine vibrator is reduced while the marine vibrator is emitting seismic energy.

11. A method as claimed in claim 10 wherein the initial depth is 50 m, the initial frequency is 7.5 Hz, the final depth is 5 m and the final frequency is 75 Hz.

12. A seismic surveying arrangement comprising:
a vessel;
a marine vibrator;
means for suspending the marine vibrator from the vessel;
a first control means for causing the marine vibrator to emit seismic energy; and
a second control means for varying the depth of the marine vibrator as it emits the seismic energy.

13. An arrangement as claimed in claim 12 wherein the second control means is adapted to control the depth of the marine vibrator on the basis of the wavelength of the seismic energy emitted by the marine vibrator.

14. An arrangement as claimed in claim 13 wherein the second control means is adapted to control the depth of the marine vibrator such that the ratio of the depth of the marine vibrator to the wavelength of the seismic energy emitted from the marine vibrator is substantially constant.

15. An arrangement as claimed in claim 14 wherein the second control means is adapted to control the depth of the marine vibrator such that the ratio of the depth of the marine vibrator to the wavelength of the seismic energy emitted by the marine vibrator is approximately one quarter.

16. An arrangement as claimed in any one of claims 12 to 15 wherein the first control means is the second control means.

* * * * *